Feb. 14, 1950 G. LACHOWICZ 2,497,362
TRAILER HITCH GUARD
Filed April 21, 1948 2 Sheets-Sheet 1
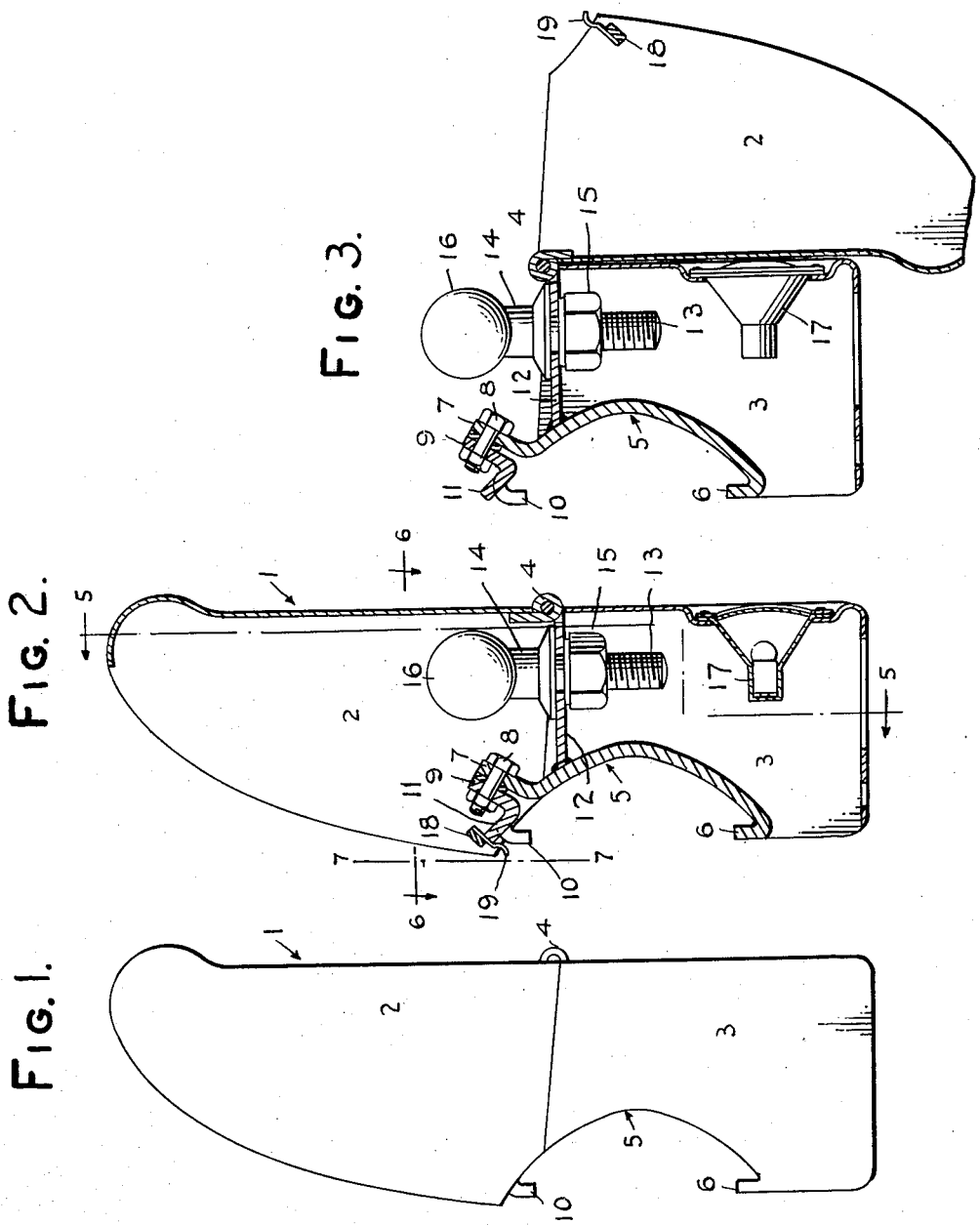
Inventor,
GENE LACHOWICZ.

Feb. 14, 1950   G. LACHOWICZ   2,497,362
TRAILER HITCH GUARD
Filed April 21, 1948   2 Sheets-Sheet 2
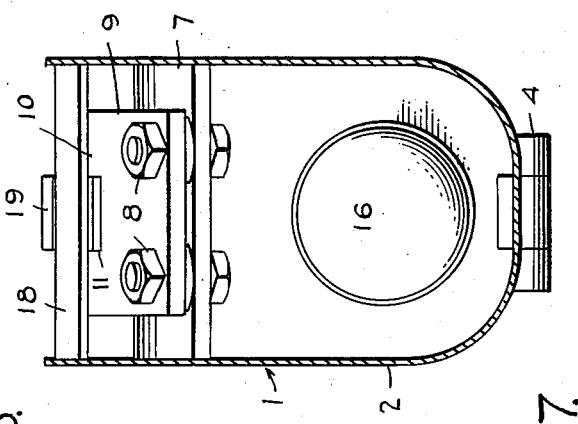
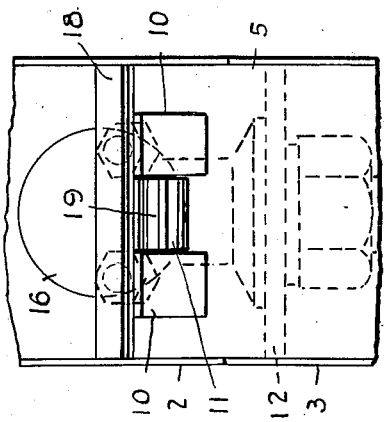
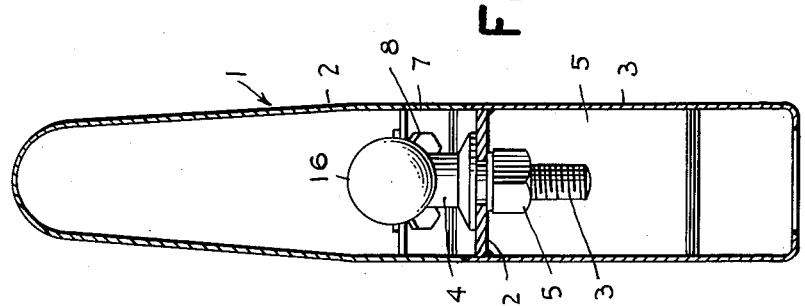
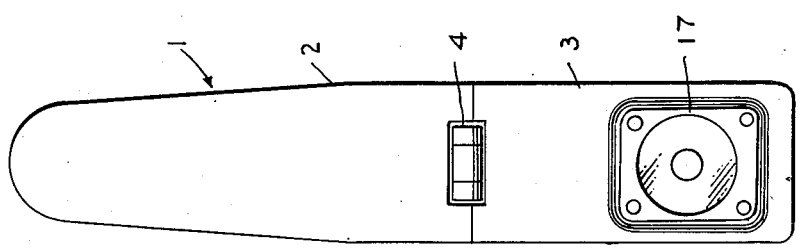
Inventor,
GENE LACHOWICZ.
By E. E. Vrooman & Co.,
attys.

Patented Feb. 14, 1950

2,497,362

UNITED STATES PATENT OFFICE 2,497,362

TRAILER HITCH GUARD

Gene Lachowicz, Detroit, Mich.

Application April 21, 1948, Serial No. 22,488

4 Claims. (Cl. 280—33.44)

This invention relates to a trailer hitch guard.

An object of the invention is the construction of a comparatively simple and efficient hitch guard that can be attached at any place on the rear fender of a motor vehicle, whereby it is easy to attach a trailer to the motor vehicle.

Another object of the invention is the construction of a bumper guard which can be quickly utilized for attaching a trailer to a motor vehicle.

A still further object of the invention is the construction of a bumper guard which comprises sections; when the sections are folded, in their normal position, the bumper appears as an ordinary bumper on the rear main bumper, but when the operator desires, he can move one of the sections out of the way, to expose a trailer hitch means, whereby a trailer can be quickly attached to the device.

With the foregoing and other objects in view, this invention comprises certain novel constructions, combinations, and arrangements of parts as will be hereinafter fully described, illustrated in the accompanying drawings, and more particularly pointed out in the appended claims.

In the drawings:

Figure 1 is a view in side elevation of a device constructed in accordance with the present invention, while Figure 2 is a vertical, central, sectional view of the same.

Figure 3 is a vertical, central section of the device, showing the top section in its open position, ready for the trailer hitch to be attached to the device.

Figure 4 is a rear view in elevation.

Figure 5 is a sectional view, taken on line 5—5, Fig. 2, and looking in the direction of the arrows.

Figure 6 is a horizontal, sectional view, taken on line 6—6, Fig. 2, and looking in the direction of the arrows.

Figure 7 is a sectional view, taken on line 7—7, Fig. 2, and looking in the direction of the arrow.

Referring to the drawings, in which the preferred embodiment of this invention is illustrated, 1 designates the guard casing. Casing 1 comprises a top section 2 and a lower or bottom section 3. These sections 2 and 3 are hingedly connected at 4.

The lower section 3 is provided with a strong rear bumper engaging portion 5. This engaging portion 5 has an upstanding hook 6 on its lower portion, which hook is to engage the lower edge portion of an ordinary bumper or fender on the rear of a motor vehicle. The engaging portion 5 is provided with an extension 7 on its upper end, through which bolts 8 extend. On bolt 8 is a bracket 9. Bracket 9 has two downwardly extending hooks 10, and between these hooks is an upwardly extending tongue 11. By means of the bolts 8 the bracket 9 is securely retained in place.

The lower section 3 is provided with a horizontal web 12, through which extends the threaded end 13 of the hitch post 14. By means of a nut 15, the post is securely mounted upon the web 12. On the upper end of hitch post 14 is an integral trailer hitch ball 16.

The lower portion or section 3 of the device is provided with a light 17. This light 17 may serve for the tail-light of a motor vehicle, or it may serve to warn approaching automobiles of the nearness of the bumper on which the light or lamp is mounted.

The top section 2 is provided with a transverse horizontal bar 18, on which is mounted a spring clip 19. When the top section 2 is in an open position, Fig. 3, and the operator swings or hinges said top section to a closed position, Fig. 2, the tongue 11 rides under the spring clip 19, locking the two sections of the device in a closed position. When the operator desires to have access to the hitch post 14, for the purpose of attaching a trailer thereto, all he has to do is to exert a comparatively slight pressure upon the top of the top section 2, with the intent of swinging said section to its open position, whereupon the spring clip 19 will be released from the tongue 11, allowing the entire opening of the device, as clearly shown in Figure 3.

To position the guard casing 1 upon a bumper, the operator places the lower hook 6 under the lower edge of the bumper, and having loosened bolts 8, he can place the upper hook 10 over the top edge of the bumper, whereupon bolts 8 can be tightened, thereby securely fastening the device in place upon the rear bumper of the motor vehicle.

It is to be understood that when the device is not being used as a hitch for a trailer, its sections having been closed together, Fig. 1, will result in the appearance of an ordinary guard or bumper device, mounted upon the rear bumper or fender of the automobile.

While I have described the preferred embodiment of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In a device of the class described, the combination of a lower section provided on its front portion with bumper engaging means, said bumper engaging means including a hook, said bumper engaging means provided with a detachable bracket having bumper hooking means, a hitch post supported upon said lower section, and a hingedly mounted top section on said lower section and being adapted to substantially cover said hitch post.

2. In a device of the class described, the combination of a lower section provided in its back with a light, said lower section provided on its front with bumper engaging portion, said bumper engaging portion provided on its lower end with an upstanding hook, said bumper engaging portion provided on its upper end with an extension, bolts on said extension, a bracket mounted upon said bolts, said bracket including a tongue and two downwardly extending hooks at the sides of said tongue, said lower section provided with a horizontal web at its upper end, a hitch post provided with a ball mounted on said web, a top section hingedly mounted on the upper outer edge of said lower section, said top section provided with a horizontal bar, an outwardly extending spring clip on said bar, and said spring clip being adapted to engage said tongue for holding the top section in a closed position upon said lower section, substantially as shown and described.

3. In a device of the class described, the combination of a lower section, said lower section provided on its front with bumper engaging portion, said bumper engaging portion provided on its lower end with a hook, said bumper engaging portion provided on its upper end with an extension, a bracket and means mounting said bracket on said extension, said bracket comprising a tongue and hooks, said lower section provided with a web, a hitch post on said web, a top section hingedly mounted on said lower section, a spring clip and means mounting said clip on said top section, and said spring clip being adapted to ride upon and clamp said tongue.

4. In a device of the class described, the combination of a lower section, said lower section provided on its front with a bumper engaging portion, said bumper engaging portion provided on its lower portion with an upwardly extending hook, said bumper engaging portion provided on its upper portion with an extension, a bracket and means detachably mounting said bracket upon said extension, said bracket including a pair of hooks and a tongue between said hooks, said lower section provided with a web and a hitch post on said web, a top section hingedly mounted on said lower section, and a spring-carrying bar on said top section, whereby when the top section is in a closed position, said bar and its spring means will be above and in engagement with the outer end of said extension.

GENE LACHOWICZ.

REFERENCES CITED

The following references are of record in the file of this patent:

UNITED STATES PATENTS

| Number | Name | Date |
| --- | --- | --- |
| 605,367 | Wright et al. | June 7, 1898 |
| 646,347 | Betty | Mar. 27, 1900 |
| 2,206,023 | Broadwell | July 2, 1940 |
| 2,342,907 | Stall | Feb. 29, 1944 |